March 30, 1926.
W. R. GREEN
TIRE CARRIER
Filed June 21, 1923    2 Sheets-Sheet 2
1,578,823
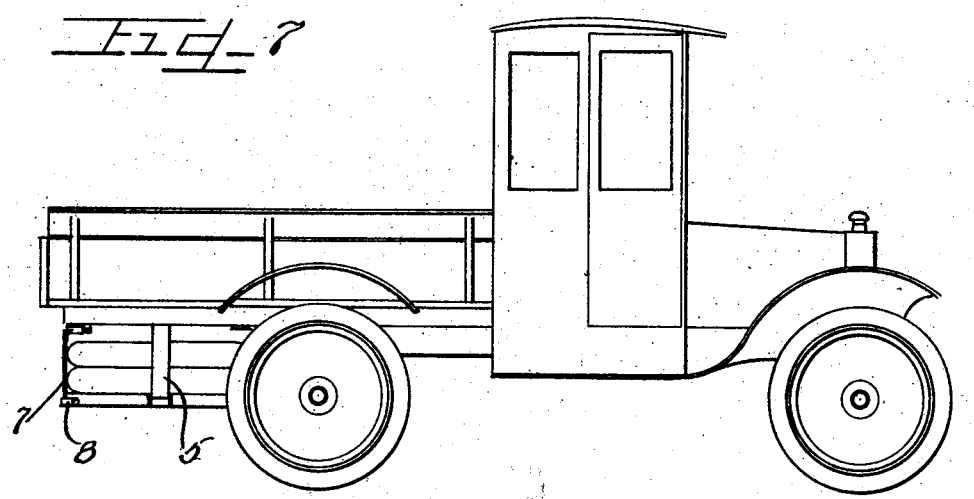
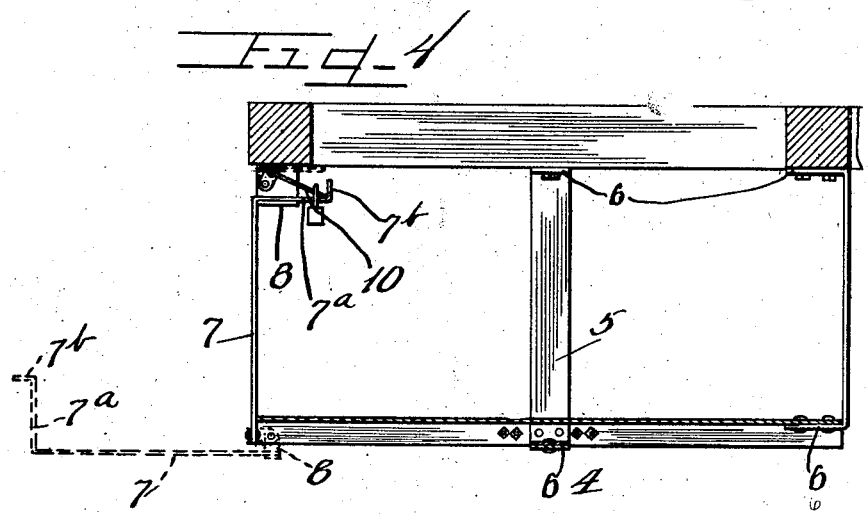
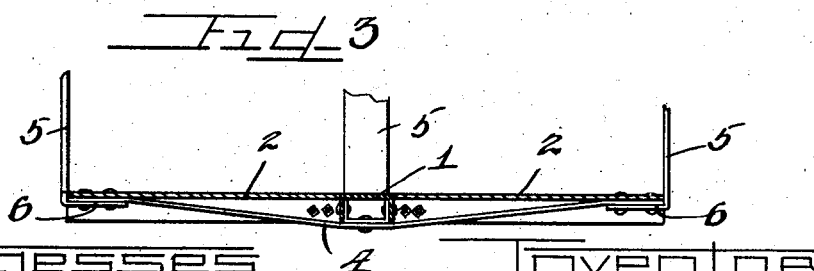

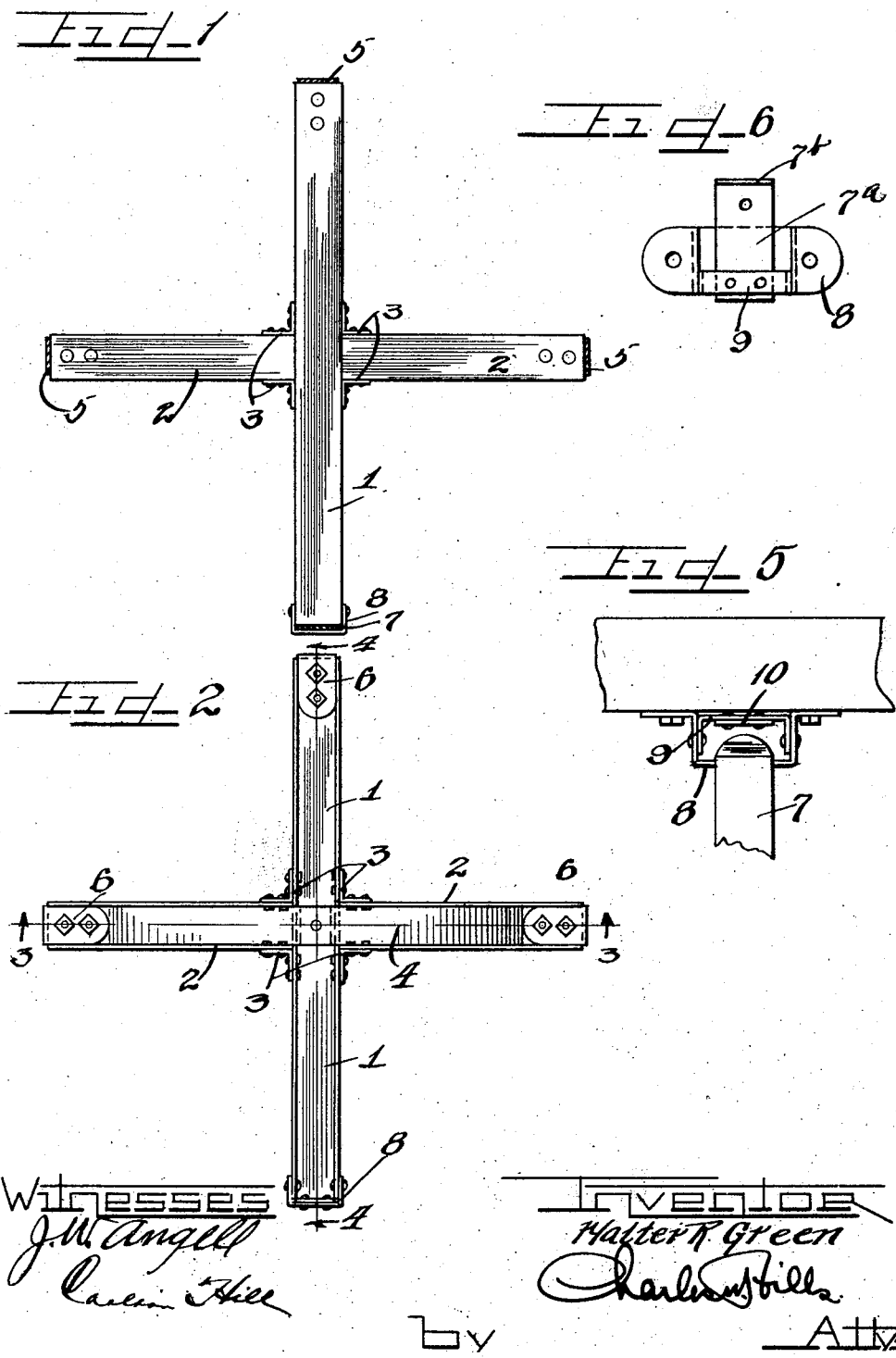

Patented Mar. 30, 1926.

1,578,823

UNITED STATES PATENT OFFICE.

WALTER R. GREEN, OF CHICAGO, ILLINOIS.

TIRE CARRIER.

Application filed June 21, 1923. Serial No. 646,312.

*To all whom it may concern:*

Be it known that I, WALTER R. GREEN, a citizen of the United States, and a resident of the city of Chicago, in the county of Cook and State of Illinois, have invented certain new and useful Improvements in a Tire Carrier; and I do hereby declare that the following is a full, clear, and exact description of the same, reference being had to the accompanying drawings, and to the numerals of reference marked thereon, which form a part of this specification.

This invention relates to a tire carrier adapted for attachment to the bottom of the body of trucks and vehicles and the like.

It is an object of this invention to provide a simple and durable carrier that can be readily attached to the bottom of a truck or the like with provision of inserting and removing tires without much effort and in which the tires can be readily locked against theft.

With these and other objects in view, this invention comprises the novel mechanism and combinations hereinafter described and more particularly pointed out and defined in the appended claims.

In the accompanying drawings, which illustrate a preferred embodiment of this invention, and in which similar reference numerals refer to similar features in the different views:

Figure 1 is a top plan view of the carrier with the supporting standards thereof shown in section.

Figure 2 is a bottom plan view of the carrier.

Figure 3 is a section taken substantially upon the line 3—3 of Figure 2, with the standards shown broken off.

Figure 4 is a section taken substantially upon the line 4—4 of Figure 2, showing a part of the truck body in section and a part in elevation.

Figure 5 is an enlarged fragmentary elevational view of the latching means for the carrier.

Figure 6 is a top plan view of the supporting stirrup and the carrier gate.

Figure 7 illustrates the application of the carrier to a truck.

As shown on the drawings:

Referring to the drawings, which illustrate one form of the invention, the carrier consists of a supporting platform which is adapted to be supported by vertical standards or brackets, and having a movable gate for the introduction and removal of tires from the carrier and means are provided for locking the gate in closed position.

The platform or base consists of a channel member 1 adjacent the sides of which are secured the channel sections 2 at right angles thereto. The inner ends of the channel members 2 abut the flanges of the channel 1 approximately at the central point. Angle clips 3 are used to connect the channel members 2 to the channel member 1.

A form of truss 4 (Fig. 3) connected respectively at its ends to the outer ends of the channel members 2 and taking over the flanges of the channel 1 at its middle point serves to brace the outer free ends of the channel sections 2. The platform is hence in the form of a cross, but any other form or shape may be used.

Supporting standards 5, having upper and lower right angled flanges 6, serve to suspend the carrier from the body of the truck, the lower flanges of the standards being inserted between the flanges of the channels which are directed downwardly and bolted thereto, the upper flanges being secured to the beams of the truck body, as shown in Fig. 4. Three such standards 5 are used, one at each of the outer ends of the channels 2 and one at one of the ends of the channel 1. The other end of the channel 1 has a swinging gate or member 7 pivotally secured thereto, as shown in Fig. 4.

The gate or member 7 consists of a metal slat or the like secured at its lower end to the web of a U-shaped clip 8 which fits over one end of the channel 1 and is pivoted to the side flanges thereof so that the same may swing from a horizontal position to an upright position, as shown in Fig. 4. The upper end of the gate 7 is provided with an inwardly directed right-angled portion 7$^a$ which terminates in an upwardly directed stop flange or lug 7$^b$.

A keeper or stirrup 8 in the form of a U-shaped bracket is attached to the body of the truck for receiving the right-angled portion 7$^a$, as shown in Figs. 4 and 5. An inverted U-shaped support or bracket 9 (Figs. 5 and 6) is positioned within the keeper 8 and pivoted to the sides thereof so that the same may swing relatively thereto. A locking tongue or lug 10 is secured to the web of the bracket 9 so as to swing therewith into or out of the path of the lug 7$^b$. The forward or free end of this locking tongue 10 is normally adapted to drop in front of the stop lug 7ᵇ to hold or lock the gate 7 in closed position. The locking tongue 10 and the right-angled extension 7ᵃ are provided with registering apertures to receive the hasp of a padlock whereby the gate 7 may be locked in its closed position to prevent theft of the tires. The carrier is preferably supported so that the gate 7 is adjacent the rear end of the truck, as shown in Fig. 7, so that ready access thereto is possible.

The tires are supported upon the cross-shaped platform and retained from lateral movement by the three uprights 5 and the gate 7. The carrier is shown of a sufficient depth to accommodate two tires, one superposed upon the other, but the carrier may be made of any other suitable depth.

The two opposite uprights 5 on the ends of the channels 2 are necessarily spaced 180° apart in a circumferential direction so that when the gate 7 is unlatched and swung into a horizontal position, as shown in Fig. 4, tires can be readily inserted or removed from the carrier, but when the gate 7 is swung to a vertical position and its upper end latched by the locking tongue 10, and locked by the padlock, the tires are securely locked in the carrier.

The carrier is very simple, yet strong and durable, and may be readily applied to the bottom of a truck body. The outwardly swinging gate at the rear of the vehicle provides ready access to the carrier.

I am aware that numerous details of construction may be varied through a wide range without departing from the principles of this invention, and I therefore do not purpose limiting the patent granted otherwise than necessitated by the prior art.

I claim as my invention:

1. In an underslung tire carrier, a pair of crossed members, an attaching bracket secured to each of the ends of one member, and to one end of the other member, a gate hinged to the other end of such other member, said gate having an upper inwardly bent end with an upstanding flange, and a latch adapted for locking engagement with such flange.

2. In an underslung tire carrier for vehicles having side rails and a transverse member, comprising a platform, brackets connecting said platform and rails, a vertically swingable gate hinged to said platform and having an upper inwardly extended flange provided with a stop shoulder, a keeper upon said transverse member for receiving the inwardly extending flange of said gate, a latch pivoted to said keeper for engaging said stop shoulder and means for locking said keeper to said flange.

In testimony whereof I have hereunto subscribed my name.

WALTER R. GREEN.